United States Patent
Zhao et al.

(12) 
(10) Patent No.: US 6,565,989 B2
(45) Date of Patent: May 20, 2003

(54) BONDED NIOBIUM SILICIDE AND MOLYBDENUM SILICIDE COMPOSITE ARTICLES USING GERMANIUM AND SILICON BASED BRAZES

(75) Inventors: Ji-Cheng Zhao, Niskayuna, NY (US); Melvin Robert Jackson, Niskayuna, NY (US); Bernard Patrick Bewlay, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/867,487

(22) Filed: May 30, 2001

(65) Prior Publication Data

US 2003/0002981 A1 Jan. 2, 2003

(51) Int. Cl.$^7$ .......................... B32B 15/00; B23K 31/02
(52) U.S. Cl. .................. 428/662; 228/101; 228/227; 228/262.7; 228/262.8; 228/262.9; 416/223 R; 416/241 R; 428/636; 428/641; 428/656; 428/660; 428/663; 428/666; 428/668; 428/669; 428/670; 428/672
(58) Field of Search ................. 428/662, 636, 428/641, 656, 660, 663, 666, 668, 669, 670, 672; 228/101, 227, 262.7, 262.8, 262.9; 416/223 R, 241 R (56) References Cited

U.S. PATENT DOCUMENTS

| | | | |
|---|---|---|---|
| 3,633,110 A | 1/1972 | Sullivan et al. | |
| 3,736,638 A | 6/1973 | Stone, Jr. | |
| 3,909,917 A | * 10/1975 | Lebedev et al. | ............ 228/227 |
| 4,611,752 A | 9/1986 | Jahnke | |
| 4,642,863 A | 2/1987 | Schulz | |
| 5,071,059 A | 12/1991 | Heitman et al. | |
| 5,072,871 A | 12/1991 | Moracz et al. | |
| 5,099,573 A | 3/1992 | Krauss et al. | |
| 5,626,462 A | 5/1997 | Jackson et al. | |
| 5,640,767 A | 6/1997 | Jackson et al. | |
| 5,820,337 A | 10/1998 | Jackson et al. | |

* cited by examiner

*Primary Examiner*—Robert R. Koehler
(74) *Attorney, Agent, or Firm*—Robert P. Santandrea; Noreen C. Johnson (57) ABSTRACT

An airfoil having a melting temperature of at least about 1500° C. and comprising a first piece and a second piece joined by a braze to the first piece. The first piece comprises one of a first niobium-based refractory metal intermetallic composite and a first molybdenum-based refractory metal intermetallic composite, and the second piece comprises one of a second niobium-based refractory metal intermetallic composite and a second molybdenum-based refractory metal intermetallic composite. The braze joining the first piece to the second piece comprises one of germanium and silicon, and one of chromium, titanium, gold, aluminum, palladium, platinum, and nickel. This abstract is submitted in compliance with 37 C.F.R. 1.72(b) with the understanding that it will not be used to interpret or limit the scope of or meaning of the claims.

110 Claims, 3 Drawing Sheets

BONDED NIOBIUM SILICIDE AND MOLYBDENUM SILICIDE COMPOSITE ARTICLES USING GERMANIUM AND SILICON BASED BRAZES

BACKGROUND OF THE INVENTION

This application generally relates to composite articles that are joined together using brazes. More particularly, the invention described herein relates to bonded niobium-based silicide and molybdenum-based silicide composite articles that are joined together using silicon- and germanium-based brazes.

Nickel (Ni)-based superalloys have been used as jet engine materials for many years. The surface temperatures at the hottest locations of state-of-the-art jet engine turbine airfoils now approach 1,150° C., which is approximately 85% of the melting temperatures of Ni-based superalloys. Niobium (Nb) and molybdenum (Mo) based refractory metal intermetallic composites (hereinafter referred to as "Nb-based RMICs" and "Mo-based RMICs,") have much higher potential application temperatures, provided that they can be used at approximately 80% or more of their melting temperatures, which are generally greater than about 1700° C.

Complex silicide-based RMICs that are made from Nb—Si—Ti—Hf—Cr—Al alloys or Mo—Si—B—Cr alloys appear to have the potential to become the next generation turbine materials with a long term, high-temperature capability that is significantly higher than that of current Ni-based superalloys. Because of their high melting temperatures, however, direct casting of hollow engine components with cooling channels from these Nb- and Mo-based RMICs is expected to be very difficult. At such high temperatures, very few materials can serve as casting cores and molds without experiencing creep, cracking, or reactions with the molten metals and thus contaminating the melt and degrading the cores. One potential alternative technique for the manufacture of complex-shaped components (e.g. airfoils) with cooling channels is to bond together, typically using brazes, two or more structural members that have been machined to the appropriate shapes. Currently, however, no such braze materials exist for these Nb- and Mo-based RMICs.

It is known in the art to make hollow components, such as turbine blades, by joining and bonding halves or multiple pieces together. However, the prior-art braze materials that have been developed for Ni-based or Fe-based alloys are not suitable for use with the new Nb- and Mo-based RMICs, which have very different alloy compositions and much higher working temperatures. Detrimental interactions are known to occur between nickel brazes, for example, and Nb-based RMICs.

Accordingly, there is a need in the art for improved high temperature composite articles that are joined together using brazes.

BRIEF SUMMARY OF THE INVENTION

The present invention meets this and other needs by providing articles formed from Nb- and Mo-based RMICs that are joined together by either a silicon- or germanium-based braze. Silicon- and germanium-based brazes for joining Nb- and Mo-based RMICs are also disclosed.

Accordingly, one aspect of the invention is to provide an article having a melting temperature of at least about 1500° C. The article comprises a first piece and a second piece joined by a braze to the first piece. The first piece comprises one of a first Nb-based RMIC and a first Mo-based RMIC, wherein the first Nb-based RMIC comprises titanium, hafnium, silicon, chromium, and niobium, and the first Mo-based RMIC comprises molybdenum, silicon, and at least one of chromium and boron. The second piece comprises one of a second Nb-based RMIC and a second Mo-based RMIC, wherein the second Nb-based RMIC comprises titanium, hafnium, silicon, chromium, and niobium, and the second Mo-based RMIC comprises molybdenum, silicon, and at least one of chromium and boron.

A second aspect of the invention is to provide an airfoil having a melting temperature of at least about 1500° C. The airfoil comprises a first piece and a second piece joined by a braze to the first piece. The first piece comprises one of a first Nb-based RMIC and a first Mo-based RMIC, wherein the Nb-based RMIC comprises titanium, hafnium, silicon, chromium, and niobium, and the first Mo-based RMIC comprises molybdenum, silicon, and at least one of chromium and boron. The second piece comprises one of a second Nb-based RMIC and a second Mo-based RMIC, wherein said second Nb-based RMIC comprises titanium, hafnium, silicon, chromium, and niobium, and the second Mo-based RMIC comprises molybdenum, silicon, and at least one of chromium and boron.

A third aspect of the invention is to provide an airfoil having a melting temperature of at least about 1500° C. and comprising a first piece and a second piece joined by a braze to the first piece. The first piece comprises one of a first Nb-based RMIC and a first Mo-based RMIC, wherein the Nb-based RMIC comprises titanium, hafnium, silicon, chromium, and niobium, and the first Mo-based RMIC comprises molybdenum, silicon, and at least one of chromium and boron. The second piece comprises one of a second Nb-based RMIC and a second Mo-based RMIC, wherein the second Nb-based RMIC comprises titanium, hafnium, silicon, chromium, and niobium, and the second Mo-based RMIC comprises molybdenum, silicon, and at least one of chromium and boron. The braze joining the first piece to the second piece comprises one of germanium and silicon, and one of chromium, titanium, gold, aluminum, palladium, platinum, and nickel.

A fourth aspect of the invention is to provide a turbine assembly having at least one component having a melting temperature of at least about 1500° C. and comprising a first piece and a second piece joined by a braze to the first piece. The first piece comprises one of a first Nb-based RMIC and a first Mo-based RMIC, wherein the Nb-based RMIC comprises titanium, hafnium, silicon, chromium, and niobium, and the first Mo-based RMIC comprises molybdenum, silicon, and at least one of chromium and boron. The second piece comprises one of a second Nb-based RMIC and a second Mo-based RMIC, wherein the second Nb-based RMIC comprises titanium, hafnium, silicon, chromium, and niobium, and the second Mo-based RMIC comprises molybdenum, silicon, and at least one of chromium and boron. The braze joining the first piece to the second piece comprises one of germanium and silicon, and one of chromium, titanium, gold, aluminum, palladium, platinum, and nickel.

Finally, a fifth aspect of the invention is to provide a method of making an article having a melting temperature of at least about 1500° C. and comprising a first piece and a second piece that are joined together by a braze. The first piece and second piece each comprise one of a Nb-based RMIC and a Mo-based RMIC, wherein the Nb-based RMIC comprises titanium, hafnium, silicon, chromium, and niobium and the Mo-based RMIC comprises molybdenum, silicon, and at least one of chromium and boron. The method comprises the steps of: providing the first piece and the second piece such that the first piece and the second piece form a an interface therebetween; providing a braze to the interface between the first piece and the second piece, the braze having a melting temperature and comprising one of germanium and silicon and one of chromium, titanium, gold, aluminum, palladium, platinum, and nickel; heating the first piece, the second piece, and the braze to a first temperature for a first predetermined hold time, the first temperature being at least 20° C. above the melting temperature of the braze; and further heating the first piece, the second piece, and the braze to a temperature between about 1300° C. and about 1450° C. for a second predetermined hold time, thereby joining the first piece and the second piece at the interface and forming the article.

These and other aspects, advantages, and salient features of the present invention will become apparent from the following detailed description, the accompanying drawings, and the appended claims.

DETAILED DESCRIPTION OF THE INVENTION

In the following description, like reference characters designate like or corresponding parts throughout the several views shown in the figures. It is also understood that terms such as "top," "bottom," "outward," "inward," and the like are words of convenience and are not to be construed as limiting terms.

Figure 1:
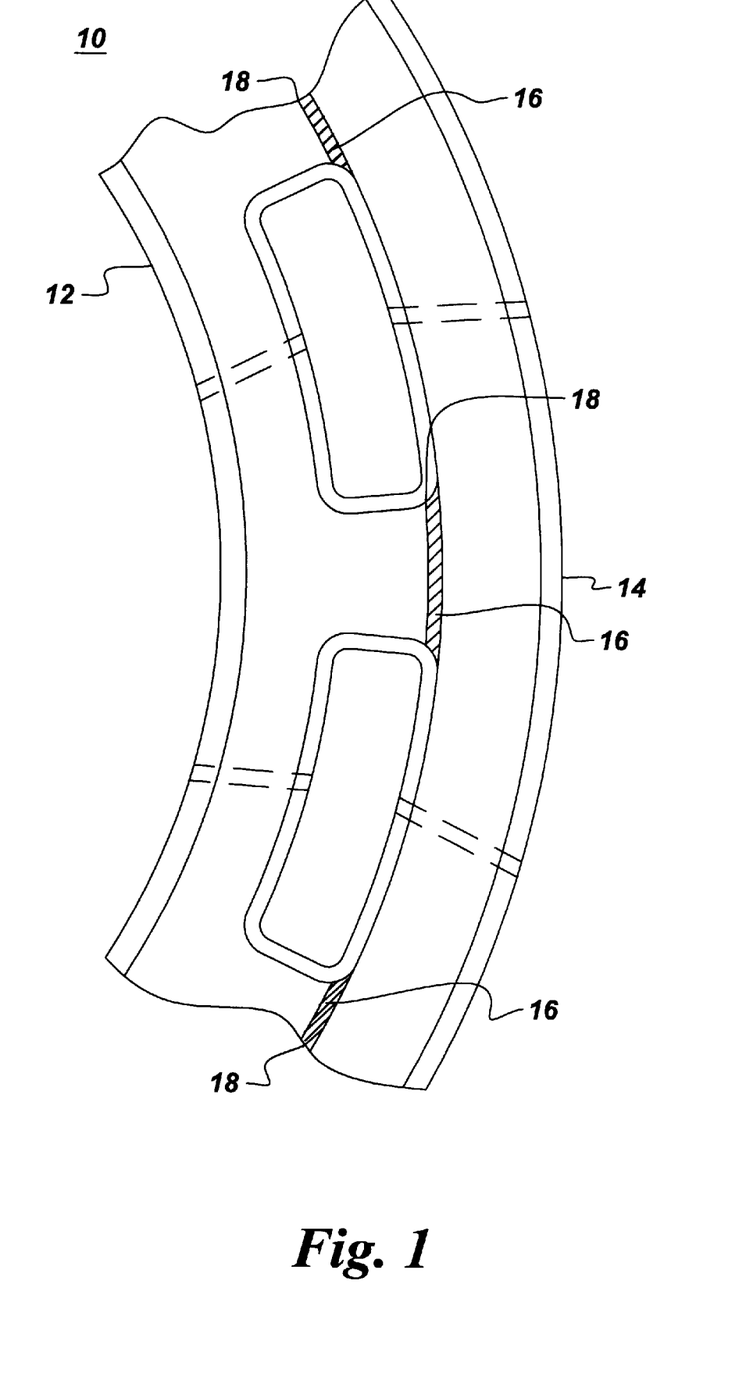
FIG. 1 is a schematic illustration of a brazed article in accordance with one embodiment of the present invention.

Referring to the drawings in general and to FIG. 1 in particular, it will be understood that the illustrations are for the purpose of describing a preferred embodiment of the invention and are not intended to limit the invention thereto.

An article 10, such as an airfoil, that is adapted for exposure to high-temperature conditions, typically greater than about 1000° C., includes a first piece 12 and a second piece 14, as shown in FIG. 1. In an exemplary embodiment, article 10 is an airfoil, for example a double-walled airfoil, for use within a hot gas path of a turbine assembly. Article 10 may be a component, such as a diffuser, casing, seal ring structure, or the like that is intended for use in a turbine assembly or any other structure in which temperatures in excess of about 1000° C. are encountered. Article 10 has a melting temperature of at least about 1500° C. Preferably, article 10 has a melting temperature of at least about 1700° C.

First piece 12 is made of a first niobium based refractory metal intermetallic composite (hereinafter referred to as "Nb-based RMIC") or a first molybdenum silicide based refractory metal intermetallic composite (hereinafter referred to as "Mo-based RMIC"). The first Nb-based RMIC typically comprises titanium, hafnium, silicon, chromium, and niobium and first Mo-based RMIC typically comprises molybdenum, silicon, and at least one of chromium and boron.

Second piece 14 is joined by a braze 16 to first piece 12. Second piece 14 is made of a second Nb-based RMIC or a second Mo-based RMIC The second Nb-based RMIC typically comprises titanium, hafnium, silicon, chromium, and niobium, and the second Mo-based RMIC typically comprises molybdenum, silicon, and at least one of chromium and boron.

The Nb-based RMICs that are used to form the article 10 of the present invention possess a good balance of oxidation resistance and mechanical properties. The Nb-based RMICs preferably have compositions in the range of: between about 20 and about 30 atomic percent titanium; between about 13 and about 20 atomic percent silicon; between about 2 and about 10 atomic percent hafnium; between about 1 and about 12 atomic percent chromium; between about 1 and about 3 atomic percent aluminum; and between about 5 and about 7 atomic percent boron; with the balance comprising niobium. In order to provide even greater oxidation resistance, these alloys may optionally contain greater amounts of chromium and aluminum. In addition, the Nb-based RMICs may further include up to about 4 atomic percent Ge, and up to about 6 atomic percent each of Mo, Ta, V, W, Fe, Sn, and Zr.

In the present invention, the Mo-based RMICs that are used to form the article 10 are based on molybdenum silicides, such as, but not limited to, $MoSi_2$, $Mo_3Si$, $Mo_5Si_3$, and $Mo_5SiB_2$ and comprise molybdenum, silicon, and at least one of boron or chromium. The Mo-based RMICs preferably comprise between about 2.5 as and about 13.5 atomic percent silicon, between about 3.5 and about 26.5 atomic percent boron, and a balance of molybdenum. Alternatively, the Mo-based RMICs may comprise between about 13 and about 16 atomic percent silicon, between about 25 and about 40 atomic percent chromium, and a balance of molybdenum. The Mo-based RMICs may also include other elements, such as, but not limited to, tantalum, titanium, zirconium, rhenium, carbon, hafnium, germanium, tungsten, vanadium, tin, and aluminum.

The joints formed by braze 16 at interface 18 in article 10 must sustain thermal, axial/centrifugal, and pressure differential stresses. In an airfoil, for example, the gas path side of the article (formed by second piece 14 in FIG. 1) may experience temperatures of about 1315° C., whereas the cold side (formed by first piece 12 in FIG. 1) may only reach about 1000° C. Both steady-state and transient (during aircraft takeoffs and landings) thermal stresses act upon the bonding surfaces in shear mode. The pressure differential between the gas path side and the cold side can be as high as about 0.1 ksi, and it will exert ballooning, or tensile, stresses on the bonding surfaces at interface 18. In addition, the airfoils also produce centrifugal stresses during rotation that act upon the bonding surface in a shear mode. The combined stresses acting on the bonding surfaces can be very significant at the potentially high operating temperatures of a turbine assembly. The joints formed by braze 16 at interface 18 must sustain such stresses.

The interaction between braze 16, first piece 12, and second piece 14 must also be considered. The braze 16 must not significantly degrade the properties of the Nb- and/or Mo-based RMICs that form first piece 12 and second piece 14; it is preferable that braze 16 consume as little of first piece 12 and/or second piece 14 as is practical. Moreover, the braze 16 must have enough oxidation and environmental resistance to avoid internal oxidation during the brazing and subsequent homogenization processes.

Temperature regimes for the bonding operations also impose constraints on selection of braze 16 for joining first piece 12 and second piece 14. Preferably, braze 16 can be used for joining first piece 12 and second piece 14 at temperatures lower than about 1450° C. In one embodiment, braze 16 has a melting temperature between about 360° C. and about 1430° C. Bonding of first piece 12 and second piece 14 at temperatures higher than about 1450° C. requires expensive tooling and fixtures that may not be able to produce article 10 having the required precision in dimensions. In addition, internal oxidation becomes a severe threat to a good bonding at higher temperatures. On the other hand, when the braze 16 has a melting temperature below the potential operating temperatures (e.g., about 1000° C.) of article 10, care must be taken to ensure that low eutectic compositions of braze 16 with either first piece 12 or second piece 14 do not exist after homogenization of the interface.

Figure 2:
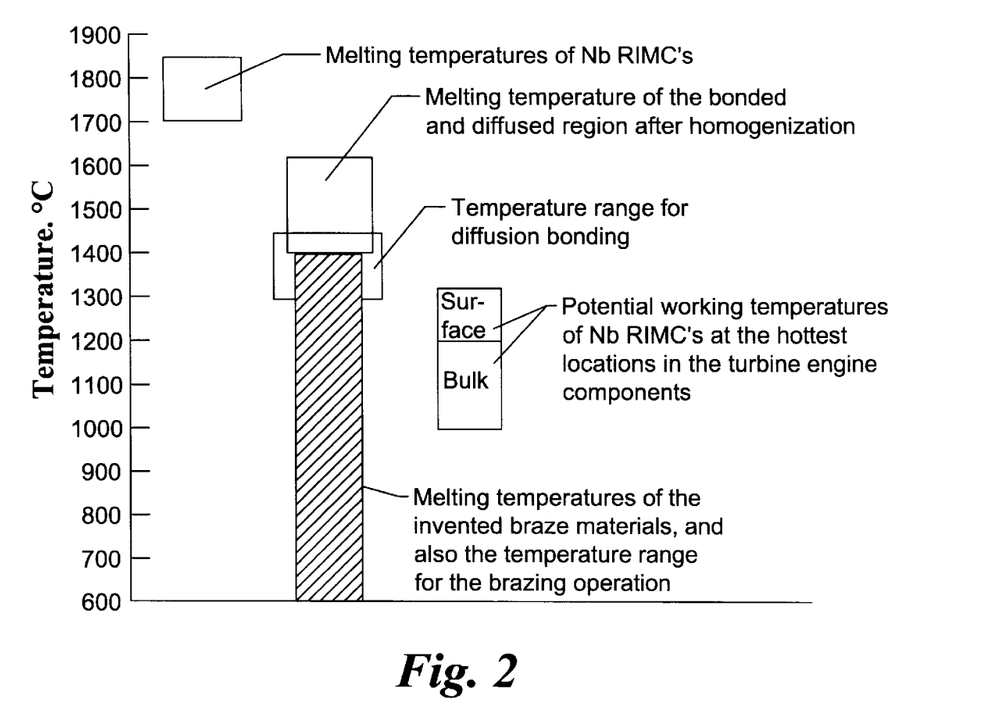
FIG. 2 is a plot of approximate temperature regimes of the brazing and homogenization operations relative to the melting temperatures and the potential working temperatures of Nb- and Mo-based RIMCs.

Interdiffusion of elements from the braze 16 into first piece 12 and second piece 14 enhances joining of first piece 12 and second piece 14 by braze 16. Thus, the solubility of the elements of braze 16 in the Nb-based and/or Mo-based RIMCs must also be taken into account. After brazing and homogenization, the bonded and diffused regions of article 10 preferably have melting temperatures of up to about 1450° C. In service, joints formed by braze 16 at interface 18 in article 10 are exposed to temperatures that are close to the bulk temperature of article 10, or up to about 1200° C., rather than the temperature of up to about 1315° C. that is experienced by the surface (formed by second piece 14 in FIG. 1) of article 10. The approximate temperature regimes of the brazing and homogenization operations relative to the melting temperatures and the potential working temperatures of Nb- and Mo-based RIMCs are summarized in FIG. 2.

Braze 16 is based on Ge-based and Si-based alloys. Germanium may be substituted for Si in the silicide phases of the Nb- and Mo-based RIMCs. In addition, Ge also has significant solubility in the metal phase. Thus, the germanium content in braze materials may be very high. Because silicon is already present in the Nb- and Mo-based RIMCs, braze 16 may have significant Si concentrations without forming detrimental phases.

Braze 16 may also comprise elements that are included in the Nb- and Mo-based RIMCs, such as Nb, Hf, Ti, Cr, Al, V, Zr, Mo, W, Te, Sn, and the like. In addition, braze 16 may include elements that are not present in the original Nb- and Mo-based RIMCs, such as, but not limited to, Pd, Pt, Au, Zr, Fe, Ni, Co, and the like. These latter elements have good solubility in the metal (bcc) phase of the Nb- and Mo-based RIMCs and thus improve braze joint ductility and toughness by promoting further formation of the metal phase.

Accordingly, braze 16 comprises a first element, which is one of germanium and silicon, and a metallic element selected from the group consisting of chromium, titanium, gold, aluminum, palladium, platinum, and nickel. Braze 16 may further include at least one additional element selected from the group consisting of platinum, palladium, gold, silicon, germanium, titanium, niobium, hafnium, aluminum, iron, cobalt, zirconium, vanadium, chromium, and boron, wherein the at least one additional element comprises up to about 20 atomic percent of braze 16. The at least one additional element is different from the first element and the metallic element.

In a first preferred embodiment of a germanium-based braze, braze 16 comprises between about 50 and 100 atomic percent germanium with the balance comprising chromium. More preferably, braze 16 comprises between about 80 and about 90 atomic percent germanium with the balance comprising chromium.

In a second preferred embodiment of a germanium-based braze, braze 16 comprises between about 75 and 100 atomic percent germanium with the balance comprising titanium. Alternatively, braze 16 may comprise between about 10 and about 25 atomic percent germanium with the balance comprising titanium. In a more preferred embodiment, braze 16 comprises between about 86 and about 90 atomic percent germanium with the balance comprising titanium. In another more preferred embodiment, braze 16 comprises between about 13 and about 17 atomic percent germanium with the balance comprising titanium.

In a third preferred embodiment, braze 16 comprises up to 100 atomic percent germanium with the balance comprising gold. More preferably, braze 16 comprises between about 23 and about 33 atomic percent germanium with the balance comprising gold.

In a fourth preferred embodiment, braze 16 comprises up to 100 atomic percent germanium with the balance comprising aluminum. More preferably, braze 16 comprises between about 33 and about 43 atomic percent germanium with the balance comprising aluminum.

In a fifth preferred embodiment, braze 16 comprises between about 10 and 100 atomic percent germanium with the balance comprising palladium. More preferably, braze 16 comprises between about 14 and about 24 atomic percent germanium with the balance comprising palladium. In another preferred embodiment, braze 16 comprises between about 59 and about 69 atomic percent germanium and a balance of palladium.

In a sixth preferred embodiment, braze 16 comprises between about 20 and 100 atomic percent germanium with the balance comprising platinum. In a more preferred embodiment, braze 16 comprises between about 35 and about 41 atomic percent germanium with the balance comprising platinum. In another more preferred embodiment, braze 16 comprises between about 74 and about 80 atomic percent germanium with the balance comprising platinum.

In a seventh preferred embodiment, braze 16 comprises between about 60 and 100 atomic percent germanium with the balance comprising nickel. More preferably, braze 16 comprises between about 62 and about 70 atomic percent germanium with the balance comprising nickel.

In a first preferred embodiment of a silicon-based braze, braze 16 comprises between about 70 and about 90 atomic percent silicon with the balance comprising chromium. More preferably, braze 16 comprises between about 80 and about 84 atomic percent silicon with the balance comprising chromium.

In a second preferred embodiment, braze 16 comprises between about 10 and about 20 atomic percent silicon with the balance comprising titanium. More preferably, braze 16 comprises between about 10 and about 16 atomic percent silicon with the balance comprising titanium.

In a third preferred embodiment, braze 16 comprises between about 75 and 100 atomic percent silicon with the balance comprising titanium. More preferably, braze 16 comprises between about 81 and about 85 atomic percent silicon with the balance comprising titanium.

In a fourth preferred embodiment, braze 16 comprises up to about 50 atomic percent silicon with the balance comprising gold. More preferably, braze 16 comprises between about 16 and about 22 atomic percent silicon with the balance comprising gold.

In a fifth preferred embodiment, braze 16 comprises up to about 70 atomic percent silicon with the balance comprising aluminum. More preferably, braze 16 comprises between about 9 and about 15 atomic percent silicon with the balance comprising aluminum.

In a sixth preferred embodiment, braze 16 comprises between about 95 and about 10 atomic percent silicon with the balance comprising palladium. In one more preferred embodiment, braze 16 comprises between about 48 and about 56 atomic percent silicon with the balance comprising palladium. In another more preferred embodiment, braze 16 comprises between about 14 and about 22 atomic percent silicon with the balance comprising palladium.

In a seventh preferred embodiment, braze 16 comprises between about 20 and 100 atomic percent silicon with the balance comprising platinum. In a more preferred embodiment, braze 16 comprises between about 24 and about 30 atomic percent silicon with the balance comprising platinum. In another more preferred embodiment, braze 16 comprises between about 64 and about 70 atomic percent silicon with the balance comprising platinum.

In an eighth preferred embodiment, braze 16 comprises between about 5 and about 70 atomic percent silicon with the balance comprising nickel. More preferably, braze 16 comprises between about 45 and about 55 atomic percent silicon with the balance comprising nickel.

Compositions of Ge-based and Si-based alloys that may be used as braze 16 are summarized in Tables 1 and 2, respectively.

TABLE 1

Ge-based braze materials for joining Nb-based and Mo-based RMICs.

| Preferred braze composition range, at. % | More preferred composition range, at. % | Further additions, total amount up to 20 at. % |
|---|---|---|
| Cr: 50–0 | Cr: 15 ± 2 | Si, Nb, Ti, Hf, Al, B |
| Ge: 50–100 | Ge: 85 ± 5 | |
| Ti: 25–0 | Ti: 12 ± 2 | Si, Nb, Cr, Hf, Al, B |
| Ge: 75–100 | Ge: 88 ± 2 | |
| Ti: 75–90 | Ti: 85 ± 2 | Si, Al, Nb, Cr, V, Zr, Hf, Pd, Pt, Au, B |
| Ge: 10–25 | Ge: 15 ± 2 | |
| Au: 0–100 | Au: 72 ± 5 | Si, Al, Ti, Nb, Cr, V, Zr, Hf, Pd, Pt, B |
| Ge: 100–0 | Ge: 28 ± 5 | |
| Al: 100–0 | Al: 72 ± 5 | Si, Ti, Nb, Cr, V, Zr, Hf, Pd, Pt, B |
| Ge: 0–100 | Ge: 28 ± 5 | |
| Pd: 0–90 | Pd: 81 ± 5 | Si, Al, Ti, Nb, Cr, V, Zr, Hf, Pt, B |
| Ge: 100–10 | Ge: 19 ± 5 | |
| | Pd: 36 ± 5 | |
| | Ge: 64 ± 5 | |
| Pt: 0–80 | Pt: 62 ± 3 | Si, Al, Ti, Nb, Cr, V, Zr, Hf, Pd, B |
| Ge: 100–20 | Ge: 38 ± 3 | |
| | Pt: 23 ± 3 | |
| | Ge: 77 ± 3 | |
| Ge: 100–60 | Ge: 66 ± 4 | Si, Ti, Cr, Fe, Co |
| Ni: 0–40 | Ni: 34 ± 4 | |

TABLE 2

Si-based braze materials for joining Nb-based and Mo-based RMICs

| Braze composition range, at. % | Preferred composition range, at. % | Further additions, total amount up to 20 at. % |
|---|---|---|
| Cr: 30–10 | Cr: 18 ± 2 | Ge, Nb, Ti, Hf, Al, B |
| Si: 70–90 | Si: 82 ± 2 | |
| Ti: 80–90 | Ti: 87 ± 3 | Ge, Al, Nb, Cr, V, Zr, Hf, Co, Fe, Ni, Pd, |
| Si: 10–20 | Si: 13 ± 3 | Pt, Au, B |
| Ti: 25–0 | Ti: 17 ± 2 | Ge, Al, Nb, Cr, V, Zr, Hf, Pd, Pt, Au, B |
| Si: 75–100 | Si: 83 ± 2 | |
| Au: 50–100 | Au: 81 ± 3 | Ge, Al, Ti, Nb, Cr, V, Zr, Hf, Pd, Pt, B |
| Si: 0–50 | Si: 19 ± 3 | |
| Al: 100–30 | Al: 88 ± 3 | Ge, Ti, Nb, Cr, V, Zr, Hf, Pd, Pt, B |
| Si: 0–70 | Si: 12 ± 3 | |
| Pd: 5–70 | Pd: 82 ± 4 | Ge, Al, Ti, Nb, Cr, V, Zr, Hf, Pt, B |
| Si: 95–10 | Si: 18 ± 4 | |
| | Pd: 48 ± 4 | |
| | Si: 52 ± 4 | |
| Pt: 0–80 | Pt: 73 ± 3 | Ge, Al, Ti, Nb, Cr, V, Zr, Hf, Pd, B |
| Si: 100–20 | Si: 27 ± 3 | |
| | Pt: 33 ± 3 | |
| | Si: 67 ± 3 | |
| Si: 5–70 | Si: 50 ± 5 | Ge, Al, Ti, Cr, Nb, Hf, Fe, Co |
| Ni: 95–30 | Ni: 50 ± 5 | |

Figure 3:
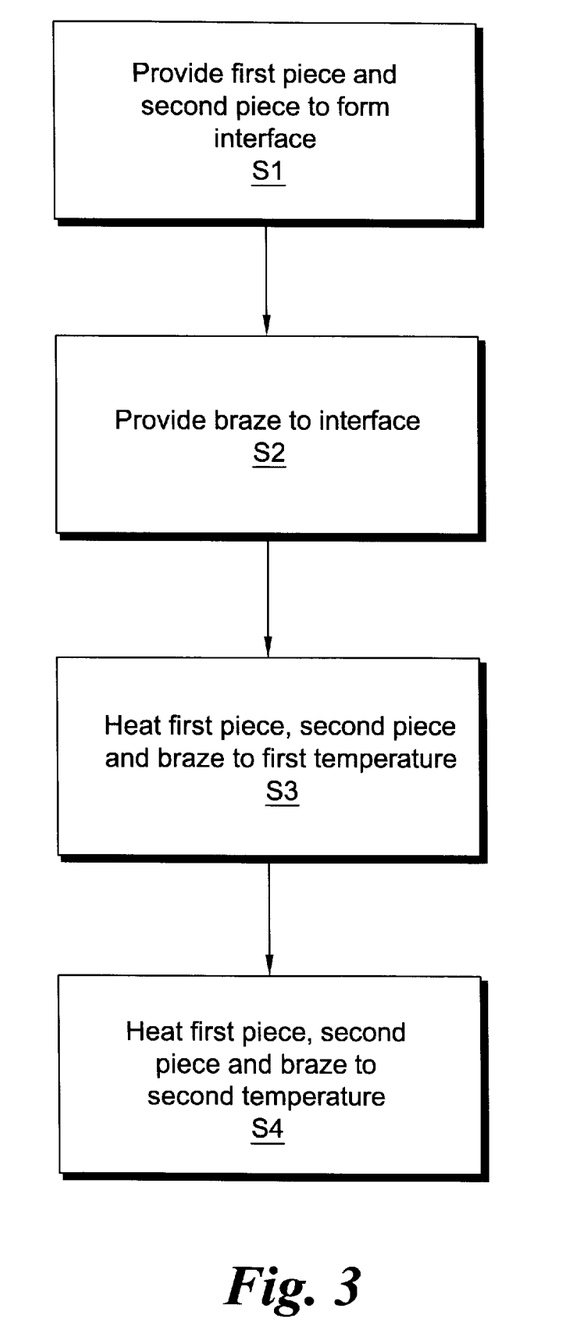
FIG. 3 is a method flow chart in accordance with one embodiment of the present invention.

A method of making article 10 is shown in FIG. 3. First, in step S1, first piece 12 and second piece 14 are provided such that first piece 12 and second piece 14 form an interface 18 therebetween.

Next, in step S2, braze 16 is provided to interface 18 between first piece 12 and second piece 14. Braze 16 may be provided to interface 18 as a foil, which is sandwiched between first piece 12 and second piece 14. In those instances where braze 16 is too brittle to be formed into a foil, either a powder tape or powder paste of braze 16 may be used to provide the braze 16 to the interface 18.

In step S3, first piece 12, second piece 14, and braze 16 are heated to a first temperature for a first predetermined hold time, the first temperature being at least about 20° C. above the melting temperature of braze 16. Next, in step S4, first piece 12, second piece 14, and braze 16 are further heated to a temperature up to about 1450° C. for a second predetermined hold time, thereby joining first piece 12 and second piece 14 at interface 18 and forming article 10.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

What is claimed is:

1. An article having a melting temperature of at least about 1500° C., said article comprising:

a) a first piece comprising one of a first niobium-based refractory metal intermetallic composite and a first molybdenum-based refractory metal intermetallic composite, wherein said first niobium-based refractory metal intermetallic composite comprises titanium, hafnium, silicon, chromium, and niobium, and said first molybdenum-based refractory metal intermetallic composite comprises molybdenum, silicon, and at least one of chromium and boron; and b) a second piece joined by a braze to said first piece, said second piece comprising one of a second niobium-based refractory metal intermetallic composite and a second molybdenum-based refractory metal intermetallic composite, wherein said second niobium-based refractory metal intermetallic composite comprises titanium, hafnium, silicon, chromium, and niobium, and said second molybdenum-based refractory metal intermetallic composite comprises molybdenum, silicon, and at least one of chromium and boron, wherein said braze comprises one 2. The article according to claim 1, wherein said braze has a melting temperature between about 360° C. and about 1430° C.

3. The article according to claim 1, wherein said braze further comprises at least one additional element selected from the group consisting of platinum, palladium, gold, silicon, germanium, titanium, niobium, hafnium, aluminum, iron, cobalt, zirconium, vanadium, chromium, and boron, and wherein said at least one additional element comprises up to about 20 atomic percent of said braze.

4. The article according to claim 1, wherein said braze comprises between about 50 and 100 atomic percent germanium and a balance of chromium.

5. The article according to claim 4, wherein said braze comprises between about 80 and about 90 atomic percent germanium and a balance of chromium.

6. The article according to claim 1, wherein said braze comprises between about 75 and 100 atomic percent germanium and a balance of titanium.

7. The article according to claim 6, wherein said braze comprises between about 86 and about 90 atomic percent germanium and a balance of titanium.

8. The article according to claim 1, wherein said braze comprises between about 10 and about 25 atomic percent germanium and a balance of titanium.

9. The article according to claim 8, wherein said braze comprises between about 13 and about 17 atomic percent germanium and a balance of titanium.

10. The article according to claim 1, wherein said braze comprises up to 100 atomic percent germanium and a balance of gold.

11. The article according to claim 10, wherein said braze comprises between about 23 and about 33 atomic percent germanium and a balance of gold.

12. The article according to claim 1, wherein said braze comprises up to 100 atomic percent germanium and a balance of aluminum.

13. The article according to claim 12, wherein said braze comprises between about 33 and about 43 atomic percent germanium and a balance of aluminum.

14. The article according to claim 1, wherein said braze comprises between about 10 and 100 atomic percent germanium and a balance of palladium.

15. The article according to claim 14, wherein said braze comprises between about 14 and about 24 atomic percent germanium and a balance of palladium.

16. The article according to claim 14, wherein said braze comprises between about 59 and about 69 atomic percent germanium and a balance of palladium.

17. The article according to claim 1, wherein said braze comprises between about 20 and 100 atomic percent germanium and a balance of platinum.

18. The article according to claim 17, wherein said braze comprises between about 35 and about 41 atomic percent germanium and a balance of platinum.

19. The article according to claim 17, wherein said braze comprises between about 74 and about 80 atomic percent germanium and a balance of platinum.

20. The article according to claim 1, wherein said braze comprises between about 60 and 100 atomic percent germanium and a balance of nickel.

21. The article according to claim 20, wherein said braze comprises between about 62 and about 70 atomic percent germanium and a balance of nickel.

22. The article according to claim 1, wherein said braze comprises between about 70 and about 90 atomic percent silicon and a balance of chromium.

23. The article according to claim 22, wherein said braze comprises between about 80 and about 84 atomic percent silicon and a balance of chromium.

24. The article according to claim 1, wherein said braze comprises between about 10 and about 20 atomic percent silicon and a balance of titanium.

25. The article according to claim 24, wherein said braze comprises between about 10 and about 16 atomic percent silicon and a balance of titanium.

26. The article according to claim 1, wherein said braze comprises between about 75 and 100 atomic percent silicon and a balance of titanium.

27. The article according to claim 26, wherein said braze comprises between about 81 and about 85 atomic percent silicon and a balance of titanium.

28. The article according to claim 1, wherein said braze comprises up to about 50 atomic percent silicon and a balance of gold.

29. The article according to claim 28, wherein said braze comprises between about 16 and about 22 atomic percent silicon and a balance of gold.

30. The article according to claim 1, wherein said braze comprises up to about 70 atomic percent silicon and a balance of aluminum.

31. The article according to claim 30, wherein said braze comprises between about 9 and about 15 atomic percent silicon and a balance of aluminum.

32. The article according to claim 1, wherein said braze comprises between about 95 and about 10 atomic percent silicon and a balance of palladium.

33. The article according to claim 32, wherein said braze comprises between about 48 and about 56 atomic percent silicon and a balance of palladium.

34. The article according to claim 32, wherein said braze comprises between about 14 and about 22 atomic percent silicon and a balance of palladium.

35. The article according to claim 1, wherein said braze comprises between about 20 and 100 atomic percent silicon and a balance of platinum.

36. The article according to claim 35, wherein said braze comprises between about 24 and about 30 atomic percent silicon and a balance of platinum.

37. The article according to claim 35, wherein said braze comprises between about 64 and about 70 atomic percent silicon and a balance of platinum.

38. The article according to claim 1, wherein said braze comprises between about 5 and about 70 atomic percent silicon and a balance of nickel.

39. The article according to claim 38, wherein said braze comprises between about 45 and about 55 atomic percent silicon and a balance of nickel.

40. The article according to claim 1, wherein said melting temperature is at least about 1700° C.

41. The article according to claim 1, wherein said first piece comprises said first niobium-based refractory metal intermetallic composite.

42. The article according to claim 41, wherein said second piece comprises said second niobium-based refractory metal intermetallic composite.

43. The article according to claim 1, wherein said first piece comprises said first molybdenum-based refractory metal intermetallic composite.

44. The article according to claim 43, wherein said second piece comprises said second molybdenum-based refractory metal intermetallic composite.

45. The article according to claim 1, wherein said article is one of an airfoil, a diffuser, a casing, and a seal ring structure.

46. The article according to claim 45, wherein said article has a service temperature of at least about 1000° C.

47. An airfoil having a melting temperature of at least about 1500° C., said airfoil comprising:
  a) a first piece comprising one of a first niobium-based refractory metal intermetallic composite and a first molybdenum-based refractory metal intermetallic composite, wherein said first niobium-based refractory metal intermetallic composite comprises titanium, hafnium, silicon, chromium, and niobium, and said first molybdenum-based refractory metal intermetallic composite comprises molybdenum, silicon, and at least one of chromium and boron; and
  b) a second piece joined by a braze to said first piece, said second piece comprising one of a second niobium-based refractory metal intermetallic composite and a second molybdenum-based refractory metal intermetallic composite, wherein said second niobium-based refractory metal intermetallic composite comprises titanium, hafnium, silicon, chromium, and niobium, and said second molybdenum-based refractory metal intermetallic composite comprises molybdenum, silicon, and at least one of chromium and boron.

48. The airfoil according to claim 47, wherein said airfoil is a double-walled airfoil.

49. The airfoil according to claim 47, wherein said airfoil is located in a hot gas path of a turbine assembly.

50. The airfoil according to claim 47, wherein said melting temperature is at least about 1700° C.

51. The airfoil according to claim 47, wherein said first piece comprises said first niobium-based refractory metal intermetallic composite.

52. The airfoil according to claim 51, wherein said second piece comprises said second niobium-based refractory metal intermetallic composite.

53. The airfoil according to claim 47, wherein said first piece comprises said first molybdenum-based refractory metal intermetallic composite.

54. The airfoil according to claim 53, wherein said second piece comprises said second molybdenum-based refractory metal intermetallic composite.

55. An airfoil having a melting temperature of at least about 1500° C., said airfoil comprising:
  a) a first piece comprising one of a first niobium-based refractory metal intermetallic composite and a first molybdenum-based refractory metal intermetallic composite, wherein said first niobium-based refractory metal intermetallic composite comprises titanium, hafnium, silicon, chromium, and niobium, and said first molybdenum-based refractory metal intermetallic composite comprises molybdenum, silicon, and at least one of chromium and boron; and
  b) a second piece joined by a braze to said first piece, said second piece comprising one of a second niobium-based refractory metal intermetallic composite and a second molybdenum-based refractory metal intermetallic composite, wherein said second niobium-based refractory metal intermetallic composite comprises titanium, hafnium, silicon, chromium, and niobium, and said second molybdenum-based refractory metal intermetallic composite comprises molybdenum, silicon, and at least one of chromium and boron, and wherein said braze comprises one of germanium and silicon, and one of chromium, titanium, gold, aluminum, palladium, platinum, and nickel.

56. The airfoil according to claim 55, wherein said braze has a melting temperature between about 360° C. and about 1430° C.

57. The airfoil according to claim 55, wherein said braze further comprises at least one additional element selected from the group consisting of platinum, palladium, gold, silicon, germanium, titanium, niobium, hafnium, aluminum, iron, cobalt, zirconium, vanadium, chromium, and boron, and wherein said at least one additional element comprises up to about 20 atomic percent of said braze.

58. The airfoil according to claim 55, wherein said braze comprises between about 50 and 100 atomic percent germanium and a balance of chromium.

59. The airfoil according to claim 55, wherein said braze comprises between about 80 and about 90 atomic percent germanium and a balance of chromium.

60. The airfoil according to claim 55, wherein said braze comprises between about 75 and 100 atomic percent germanium and a balance of titanium.

61. The airfoil according to claim 60, wherein said braze comprises between about 86 and about 90 atomic percent germanium and a balance of titanium.

62. The airfoil according to claim 55, wherein said braze comprises between about 10 and about 25 atomic percent germanium and a balance of titanium.

63. The airfoil according to claim 62, wherein said braze comprises between about 13 and about 17 atomic percent germanium and a balance of titanium.

64. The airfoil according to claim 55, wherein said braze comprises up to 100 atomic percent germanium and a balance of gold.

65. The airfoil according to claim 64, wherein said braze comprises between about 23 and about 33 atomic percent germanium and a balance of gold.

66. The airfoil according to claim 55, wherein said braze comprises up to 100 atomic percent germanium and a balance of aluminum.

67. The airfoil according to claim 66, wherein said braze comprises between about 33 and about 43 atomic percent germanium and a balance of aluminum.

68. The airfoil according to claim 55, wherein said braze comprises between about 10 and 100 atomic percent germanium and a balance of palladium.

69. The airfoil according to claim 68, wherein said braze comprises between about 14 and about 24 atomic percent germanium and a balance of palladium.

70. The airfoil according to claim 68, wherein said braze comprises between about 59 and about 69 atomic percent germanium and a balance of palladium.

71. The airfoil according to claim 55, wherein said braze comprises between about 20 and 100 atomic percent germanium and a balance of platinum.

72. The airfoil according to claim 71, wherein said braze comprises between about 35 and about 41 atomic percent germanium and a balance of platinum.

73. The airfoil according to claim 71, wherein said braze comprises between about 74 and about 80 atomic percent germanium and a balance of platinum.

74. The airfoil according to claim 55, wherein said braze comprises between about 60 and 100 atomic percent germanium and a balance of nickel.

75. The airfoil according to claim 74, wherein said braze comprises between about 62 and about 70 atomic percent germanium and a balance of nickel.

76. The airfoil according to claim 55, wherein said braze comprises between about 70 and about 90 atomic percent silicon and a balance of chromium.

77. The airfoil according to claim 76, wherein said braze comprises between about 80 and about 84 atomic percent silicon and a balance of chromium.

78. The airfoil according to claim 55, wherein said braze comprises between about 10 and about 20 atomic percent silicon and a balance of titanium.

79. The airfoil according to claim 78, wherein said braze comprises between about 10 and about 16 atomic percent silicon and a balance of titanium.

80. The airfoil according to claim 55, wherein said braze comprises between about 75 and 100 atomic percent silicon and a balance of titanium.

81. The airfoil according to claim 80, wherein said braze comprises between about 81 and about 85 atomic percent silicon and a balance of titanium.

82. The airfoil according to claim 55, wherein said braze comprises up to about 50 atomic percent silicon and a balance of gold.

83. The airfoil according to claim 82, wherein said braze comprises between about 16 and about 22 atomic percent silicon and a balance of gold.

84. The airfoil according to claim 55, wherein said braze comprises up to about 70 atomic percent silicon and a balance of aluminum.

85. The airfoil according to claim 84, wherein said braze comprises between about 9 and about 15 atomic percent silicon and a balance of aluminum.

86. The airfoil according to claim 55, wherein said braze comprises between about 95 and about 10 atomic percent silicon and a balance of palladium.

87. The airfoil according to claim 86, wherein said braze comprises between about 48 and about 56 atomic percent silicon and a balance of palladium.

88. The airfoil according to claim 86, wherein said braze comprises between about 14 and about 22 atomic percent silicon and a balance of palladium.

89. The airfoil according to claim 55, wherein said braze comprises between about 20 and 100 atomic percent silicon and a balance of platinum.

90. The airfoil according to claim 89, wherein said braze comprises between about 24 and about 30 atomic percent silicon and a balance of platinum.

91. The airfoil according to claim 89, wherein said braze comprises between about 64 and about 70 atomic percent silicon and a balance of platinum.

92. The airfoil according to claim 55, wherein said braze comprises between about 5 and about 70 atomic percent silicon and a balance of nickel.

93. The airfoil according to claim 92, wherein said braze comprises between about 45 and about 55 atomic percent silicon and a balance of nickel.

94. The airfoil according to claim 55, wherein said airfoil is a double-walled airfoil.

95. The airfoil according to claim 55, wherein said airfoil is located in a hot gas path of a turbine assembly.

96. The airfoil according to claim 55, wherein said melting temperature is at least about 1700° C.

97. The airfoil according to claim 55, wherein said first piece comprises said first niobium-based refractory metal intermetallic composite.

98. The airfoil according to claim 97, wherein said second piece comprises said second niobium-based refractory metal intermetallic composite.

99. The airfoil according to claim 55, wherein said first piece comprises said first molybdenum-based refractory metal intermetallic composite.

100. The airfoil according to claim 99, wherein said second piece comprises said second molybdenum-based refractory metal intermetallic composite.

101. The airfoil according to claim 55, wherein said airfoil has a service temperature of at least about 1000° C.

102. A turbine assembly having at least one component, said at least one component having a melting temperature of at least about 1500° C. and comprising:
  a) a first piece comprising one of a first niobium-based refractory metal intermetallic composite and a first molybdenum-based refractory metal intermetallic composite, wherein said first niobium-based refractory metal intermetallic composite comprises titanium, hafnium, silicon, chromium, and niobium, and said first molybdenum-based refractory metal intermetallic composite comprises molybdenum, silicon, and at least one of chromium and boron; and
  b) a second piece joined by a braze to said first piece, said second piece comprising one of a second niobium-based refractory metal intermetallic composite and a second molybdenum-based refractory metal intermetallic composite, wherein said second niobium-based refractory metal intermetallic composite comprises titanium, hafnium, silicon, chromium, and niobium, and said second molybdenum-based refractory metal intermetallic composite comprises molybdenum, silicon, and at least one of chromium and boron, and wherein said braze comprises one of germanium and silicon, and one of chromium, titanium, gold, aluminum, palladium, platinum, and nickel.

103. The turbine assembly according to claim 102, wherein said at least one component is one of an airfoil, a diffuser, a casing, and a seal ring structure.

104. The turbine assembly to claim 102, wherein said at least one component has a service temperature of at least about 1000° C.

105. A method of joining two pieces to form an article, the method comprising the steps of:
  a) providing a first piece comprising one of a first niobium-based refractory metal intermetallic composite and a first molybdenum-based refractory metal intermetallic composite, wherein said first niobium-based refractory metal intermetallic composite comprises titanium, hafnium, silicon, chromium, and niobium, and said first molybdenum-based refractory metal intermetallic composite comprises molybdenum, silicon, and at least one of chromium and boron;
  b) providing a second piece such that the first piece and the second piece form an interface, wherein the second piece comprises one of a second niobium-based refractory metal intermetallic composite and a second molybdenum-based refractory metal intermetallic composite, the second niobium-based refractory metal intermetallic composite comprising titanium, hafnium, silicon, chromium, and niobium, and the second molybdenum-based refractory metal intermetallic composite comprising molybdenum, silicon, and at least one of chromium and boron;
  c) providing a braze to the interface, the braze having a melting temperature and comprising one of germanium and silicon and one of chromium, titanium, gold, aluminum, palladium, platinum, and nickel;
  d) heating the first piece, the second piece, and the braze to a first temperature for a first predetermined hold time, the first temperature being at least 20° C. above the melting temperature of the braze;

e) further heating the first piece, the second piece, and the braze to a temperature between about 1300° C. and about 1450° C. for a second predetermined hold time, thereby joining the first piece and the second piece at the interface to form the article.

106. The method of claim 105, wherein the braze further comprises at least one additional element selected from the group consisting of platinum, palladium, gold, silicon, germanium, titanium, niobium, hafnium, aluminum, iron, cobalt, zirconium, vanadium, chromium, and boron, and wherein said at least one additional element comprises up to about 20 atomic percent of said braze.

107. The method of claim 105, wherein the article is an airfoil.

108. The method of claim 107, wherein the airfoil is a double-walled airfoil.

109. The method of claim 105, wherein the article has a melting temperature of at least about 1500° C.

110. The method of claim 109, wherein the article has a melting temperature of at least about 1700° C.

* * * * *